C. W. HEATH.
SHOCK ABSORBER FOR MOTOR CYCLES.
APPLICATION FILED JUNE 2, 1913.
1,104,500.
Patented July 21, 1914.
2 SHEETS—SHEET 2.
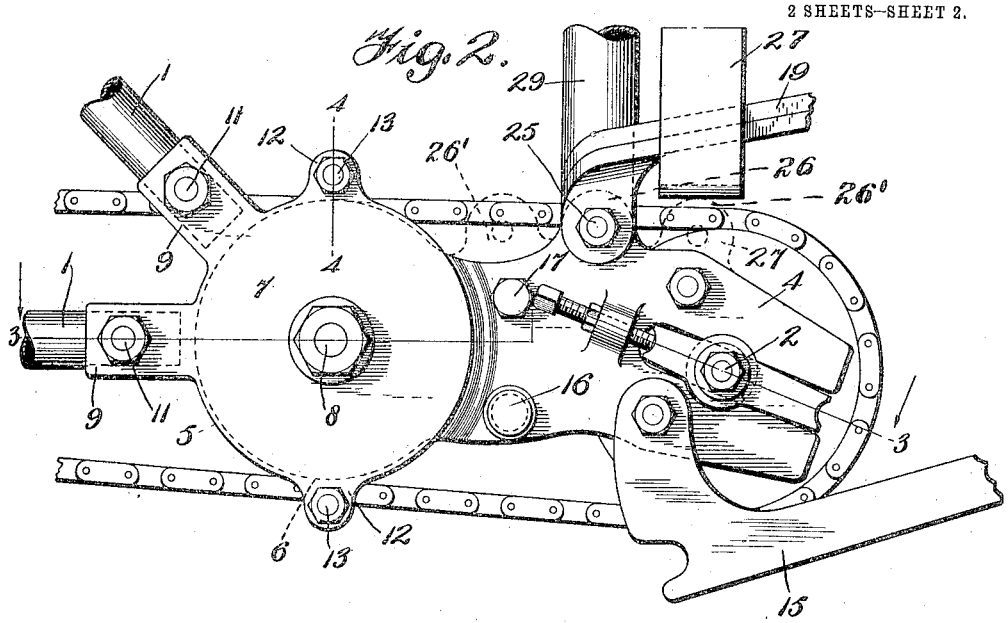
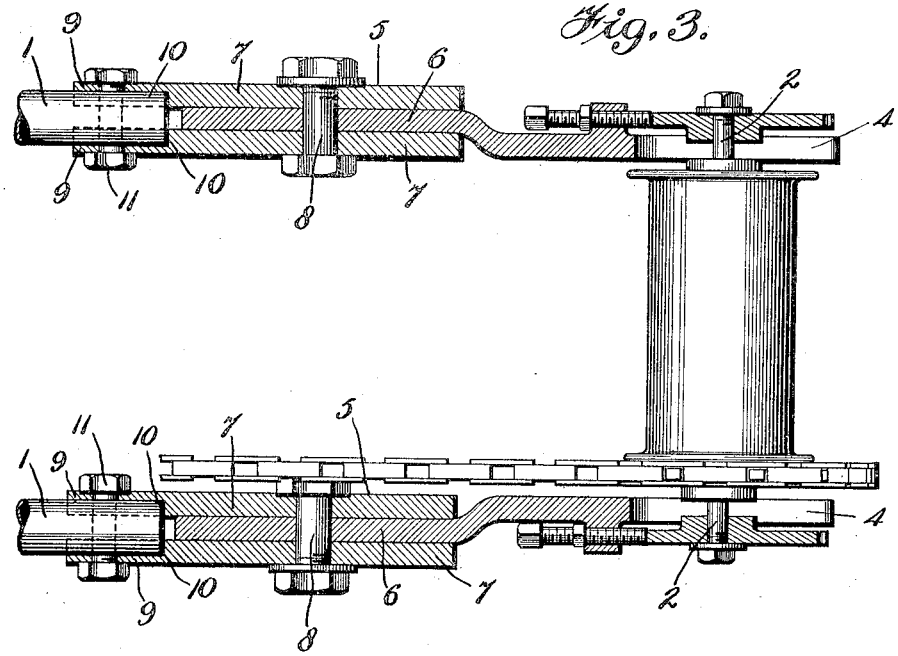
Witnesses
Byron B. Collings.
M. E. Ull
Inventor
Chas. W. Heath,
By
William C. Sinton
Attorney

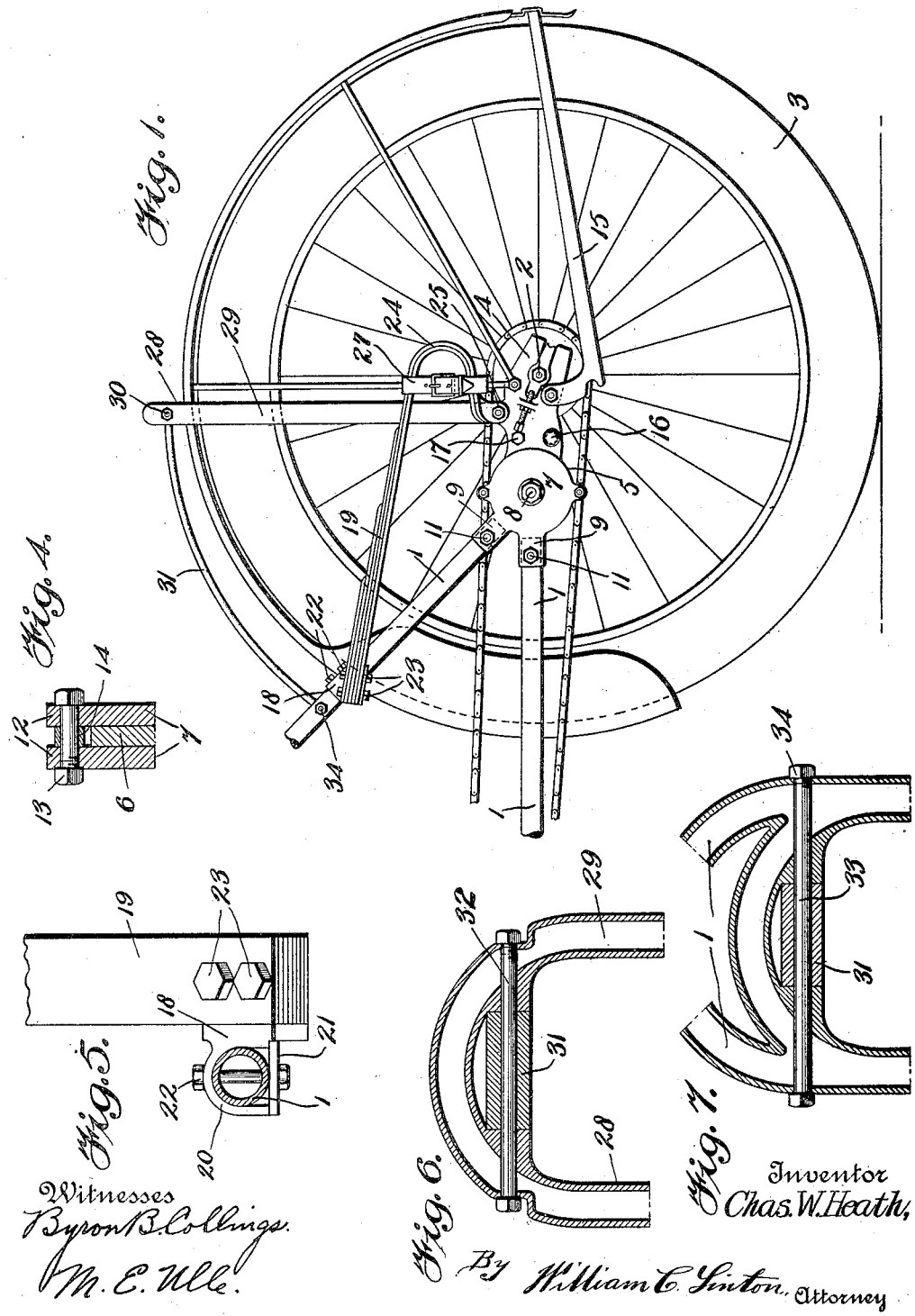

UNITED STATES PATENT OFFICE.

CHARLES W. HEATH, OF SIOUX FALLS, SOUTH DAKOTA.

SHOCK-ABSORBER FOR MOTOR-CYCLES.

1,104,500. Specification of Letters Patent. Patented July 21, 1914.

Application filed June 2, 1913. Serial No. 771,274.

*To all whom it may concern:*

Be it known that I, CHARLES W. HEATH, a citizen of the United States, residing at Sioux Falls, in the county of Minnehaha and State of South Dakota, have invented certain new and useful Improvements in Shock-Absorbers for Motor-Cycles, of which the following is a specification.

This invention relates more particularly to the construction of the rear wheel supports for motorcycles or the like, which relieves the riders of such vehicles from discomfort and to prevent injury to the motor and other parts mounted on the frame, incident to shocks and jars in running at high speed over rough and uneven roads.

The principal object of the invention is to provide a connection between the rear wheel and the frame of such vehicles which will permit the free vertical movement of the rear wheel in passing over rough and uneven roads to eliminate shocks or jars, but will at the same time prevent any lateral play or wabbling of the rear wheel, and for the attainment of this object as well as others in view to provide means of such construction and design as will be strong, durable and efficient in service as well as attractive in appearance thereby rendering the same commercially desirable.

The invention consists of the novel features of construction, combination and arrangement of parts as will be hereinafter more fully described and defined in the appended claims.

In the accompanying drawings has been illustrated the simple and preferred form of the invention it being, however, understood that no limitation is necessarily made to the precise structural details therein exhibited, but the right is reserved to any changes, alterations and modifications to which recourse may be had that come within the scope of the invention and without departing from the spirit thereof or sacrificing the efficiency of the same.

The invention will be best understood by reference being had to the accompanying drawings taken in connection with the following detailed description forming part of the specification in which:—

Figure 1, is a detail side elevation of the rear portion of a motorcycle illustrating my invention as applied thereto. Fig. 2 is an enlarged view of the connection between the rear wheel and the vehicle frame. Fig. 3, is a horizontal section taken on the line 3—3 of Fig. 2 in the direction of the arrows as shown. Fig. 4, is a detail sectional view taken on the line 4—4 of Fig. 2. Fig. 5, is a view illustrating the connection between one of the leaf springs and the vehicle frame and, Figs. 6 and 7 are detail sectional views of the auxiliary frame.

Reference being had to the accompanying drawings wherein like and corresponding parts are designated by like reference characters throughout the several views, the numeral 1 indicates the rear forks of the ordinary frame of a motorcycle to which is connected the rear axle 2 carrying the rear wheel 3 by means of my improved shock absorber embodying my invention as will be hereinafter referred to.

The rear axle 2 is adjustably connected in the usual manner within bifurcated ends of the links 4. These links 4 are hingedly connected to the rear forks 1 of the frame by means of a hinged connection indicated generally by the numeral 5 whereby the rear wheel will be permitted to move freely in a perpendicular plane as the same passes over rough and uneven roads. The links 4 comprise a substantially circular plate 6 at one end thereof, whereas the opposite end is offset and bifurcated whereby the rear wheel may be adjustably secured. The circular plates are hingedly secured within housings each comprising a pair of spaced circular plates 7 by means of bolts 8. Each of the plates 7 of the housings is provided with a pair of angular extensions 9 extending radially from the periphery thereof and each of the said extensions has formed in the inner face thereof semi-circular recesses 10 for the reception of the rear forks of the frame of the vehicle. The apexes of the rear forks of the frame are cut away whereby the extremities may rest within the recesses 10 and the extensions are rigidly connected to the extremities of the forks by means of bolts 11. Each plate 7 has formed integral therewith a pair of diametrically oppositely extending apertured lugs 12 through which extend bolts 13 whereby the said plates may be connected in pairs. Each pair of plates 7 forms a housing in which snugly fit the circular plates 6, but the said circular plates 6 are free to oscillate vertically between the plates 7 and are prevented from any lateral play to prevent the wabbling of the rear wheel of the vehicle due to the large diameters of the said plates. A cylindrical bushing 14 encircles each of the bolts 13 and is interposed between the plates 7 as more clearly illustrated in Fig. 4 of the drawings thereby holding plates 7 in the proper spaced relation to prevent the circular plates 6 from binding between the plates 7 during their reciprocating movement.

Pivotally connected to the links 4 is the usual support 15 having recesses formed therein for the reception of the lugs 16 whereby the rear end of the vehicle may be supported when not in use. One of the links 4 is provided with a bolt 17 to which the hanger arm of the coaster brake may be attached, the latter not being shown. The aforesaid parts form no part of the present invention but are described to illustrate how the same may be applied to a motor cycle provided with the present invention.

For resiliently holding the links 4 in their proper position, I secure by means of clips or collars 18 to the upper standards of the forks leaf springs 19. The clips 18 each comprise a semi-circular recessed portion 20 for the reception of the upper standards of the forks. These clips are also provided with bearing plates 21 and bolts 22 pass through the recessed portions, the standards and bearing plates for rigidly connecting the clips to the standards. Formed integral with the said clips are extensions to which are secured one end of the springs 19 by means of bolts 23.

The opposite ends of the springs 19 diverge normally from the forks 1 toward the links 4, then curve inwardly as at 24, and then are pivotally connected to the apertured extension 26 by means of bolts 25. The curved portions of the springs permit any longitudinal movement due to the links swinging about their pivot and straps 27 connect the extremities of the said curved portions to prevent the springs from breaking on their rebound stroke. To adjust the bearings so that the springs will yield more or less freely for riders of different weights the links 4 may be provided with two or more apertured extensions 26' as indicated in dotted lines in Fig. 2, at different distances from the pivot bolts 8 or fulcrums of the said links.

To impart firmness to the rear wheel I provide an auxiliary frame 28 which comprises a yoke member 29 having its extremities pivotally connected to the links 4. The intermediate portion of said yoke member is pivotally connected to a bar 31 by means of a bolt 32 as more clearly shown in Fig. 6 of the drawings and the opposite end of the bar 31 is pivotally connected to the frame 1 of the vehicle as at 33 by means of a bolt 34.

In the operation of a motorcycle or bicycle equipped with a wheel support as herein described and shown the rear axle will yield upward more or less against the tension of the springs 19 as the wheel passes over rough or uneven roads and thereby relieve the rider as well as the frame of the machine and parts mounted thereon, from jolting and jarring and possible injury to which they would otherwise be subjected.

Whereas, I have shown the springs 19 and the pivot connections 5 between the frame of the vehicle and the rear wheel on one side of the frame in the figures of the drawings with the exception of Fig. 4 it is of course to be understood the arrangement of these parts is to be duplicated on the opposite side of the vehicle frame.

Having fully described my invention what I claim as new and desire to secure by Letters Patent is:—

1. The combination with rear wheel forks, of links pivotally connected to the ends of the fork members, leaf springs secured at one end to the fork members, the opposite ends thereof being curved inwardly and secured to said links, an auxiliary frame pivotally connected to said links and means for pivotally connecting said auxiliary frame to the fork members.

2. The combination with the wheel forks of a vehicle, of links, an axle carried by said links, a circular plate carried by each of said links, a pair of plates detachably secured to each of the fork members, means for pivotally connecting one of the circular plates between each of the pairs of plates carried by the fork members and means for yieldingly connecting the said links to the fork members.

3. The combination with the wheel forks of a vehicle, having their rear apexes cut away, of a pair of circular plates adapted to be connected to each fork member, means for connecting each pair of plates and holding the same in spaced relation, angular extensions formed integrally with each of said plates, means for connecting the said extensions to the fork members, a circular plate pivotally secured between each pair of the first mentioned plates, a link carried by each of the last mentioned circular plates, the rear axle of the vehicle adapted to be secured to the said links, and means for yieldingly connecting the said links to the fork members substantially as described.

4. The combination with the rear forks of a motorcycle, of links pivotally connected thereto, an axle carried by the said links, means for yieldingly connecting the links to the fork members, an auxiliary frame, comprising a yoke member, means for pivotally connecting the extremities of the yoke member to said links, a bar pivotally connected to the fork members at one end and means for pivotally connecting the opposite end of said bar to the intermediate portion of the yoke member for the purpose specified.

5. The combination with the rear forks of a vehicle having the rear apexes of the forks cut away, of a pair of circular plates, angular extensions carried by said plates each having a recess formed in the inner face thereof, the truncated ends of the forks adapted to rest within said recesses and means for connecting the extensions to the forks, apertured lugs arranged on the diametrically opposite sides of the said plates, bolts extending through said apertured lugs for connecting each pair of plates, means for holding the plates in spaced relation a circular plate pivotally secured between each pair of first mentioned plates, offset links carried by the last mentioned circular plates, the axle of the vehicle adapted to be secured to said links, leaf springs permanently secured at one end to the forks, and diverging toward the said links, the opposite ends of the springs being curved inwardly and connected to the said links, an auxiliary frame connected to said links and means for pivotally connecting said auxiliary frame to the said fork substantially as and for the purpose specified.

In testimony whereof I affix my signature in presence of two witnesses.

CHARLES W. HEATH.

Witnesses:
E. B. SKINNER,
M. C. HEATH.

Copies of this patent may be obtained for five cents each, by addressing the "Commissioner of Patents, Washington, D. C."